No. 675,114. Patented May 28, 1901.
B. C. SHIPMAN.
ELECTRIC MOTOR CONTROL.
(Application filed June 25, 1900.)
(No Model.) 3 Sheets—Sheet 1.
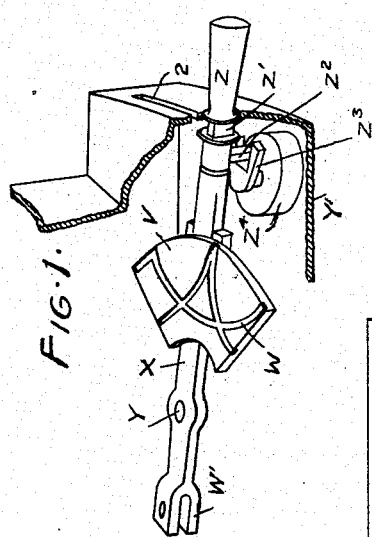
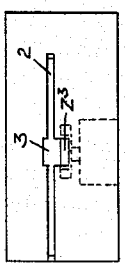
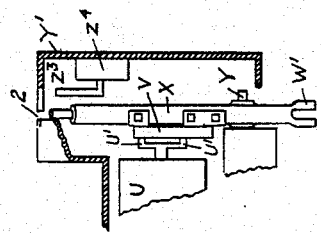
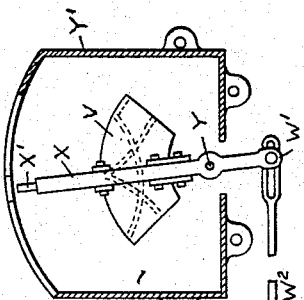
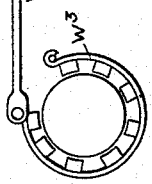
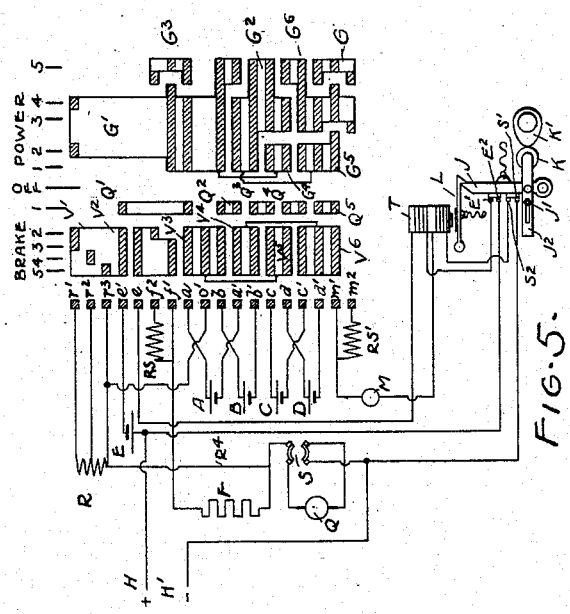
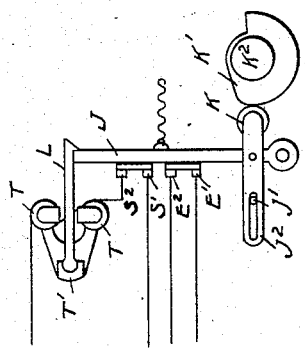
WITNESSES:
W. F. Wagner
E. S. Exley.
INVENTOR
BENNETT CARROLL SHIPMAN.
BY
ATTORNEY.

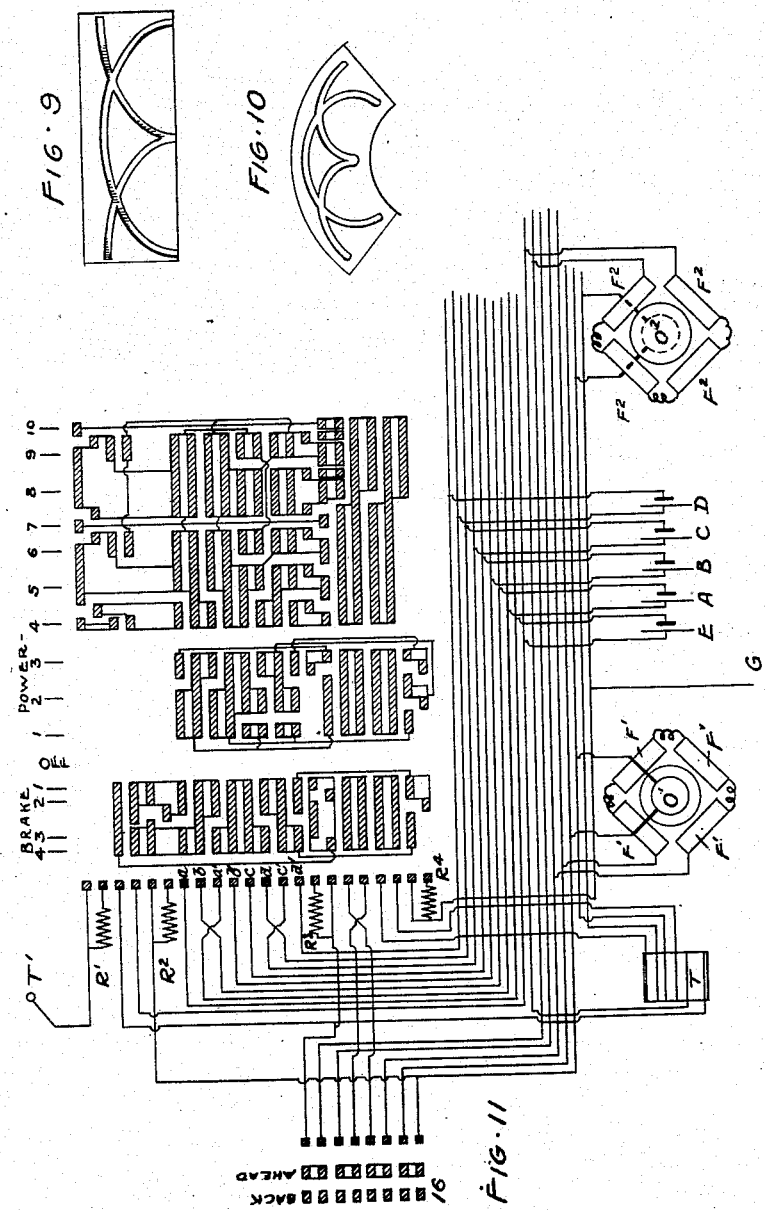

No. 675,114. Patented May 28, 1901.
B. C. SHIPMAN.
ELECTRIC MOTOR CONTROL.
(Application filed June 25, 1900.)
(No Model.) 3 Sheets—Sheet 3.
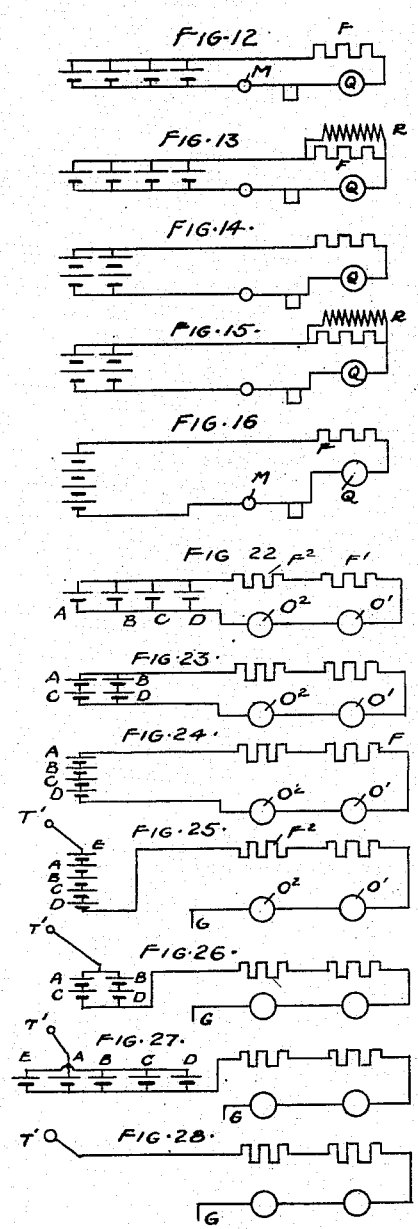
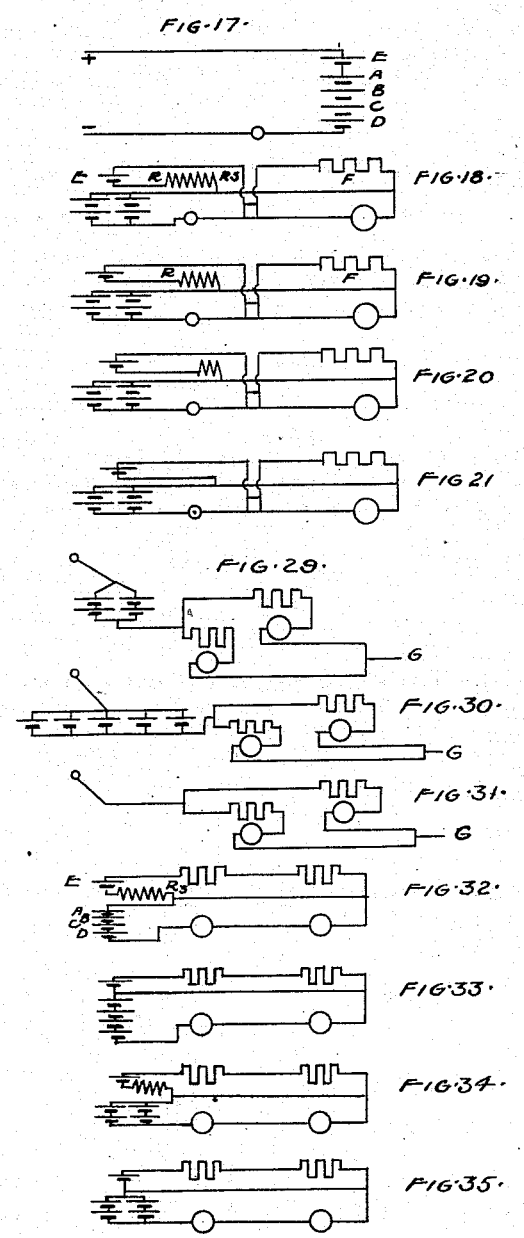
WITNESSES:
W. H. Wagner
E. S. Exley
INVENTOR
BENNETT CARROLL SHIPMAN.
BY
W. F. Keene
ATTORNEY.

UNITED STATES PATENT OFFICE.

BENNET CARROLL SHIPMAN, OF WILKINSBURG, PENNSYLVANIA.

ELECTRIC-MOTOR CONTROL.

SPECIFICATION forming part of Letters Patent No. 675,114, dated May 28, 1901.

Application filed June 25, 1900. Serial No. 21,464. (No model.)

*To all whom it may concern:*

Be it known that I, BENNET CARROLL SHIPMAN, a citizen of the United States of America, and a resident of Wilkinsburg, Allegheny county, Pennsylvania, have invented certain new and useful Improvements in Electric-Motor Control, of which the following is a specification.

The purpose of this invention is to provide mechanism for the frequent starting and stopping of the motor or motors without the loss of power usual through the generation of heat in a resistance or a mechanical brake. This power usually lost is to a large extent retained by avoiding the use of heat-producing resistance in starting and by the generation of a current in stopping, which current is conveyed to a source of supply to become again available.

Though applicable to almost any electrically-driven apparatus, my invention relates especially to the control of electrically-propelled vehicles, whether of the self-contained type—such as storage-battery cars, automobiles, &c.—or of the type with an extraneous source of power, as trolley-cars, &c. By "control" I would have understood not only the proper governing speed in driving, but also the proper retardation in braking. It is a well-known fact that power is consumed at a large rate in starting a vehicle from a state of rest and at a comparatively small rate in keeping such vehicle in motion. In the great majority of cases the power so used in starting is never recovered, but is thrown away in friction when stopping the vehicle. In the case of electrically-propelled vehicles there is an additional loss of power in starting due to the very inefficient means employed to regulate the current, and such additional loss in the great majority of cases can never be recovered by the very nature of the regulation employed—namely, resistance—as it is immediately converted into heat and dissipated. Attempts have been made to recover that part of the loss occasioned in overcoming the inertia of the vehicle by converting the motors into generators when braking and sending the generated current back to line or to the batteries, according to the source of power of such vehicle. My invention relates to this class of control; and it consists of a more certain and simpler means of attaining the object sought and also of recovering the second-mentioned loss—that occasioned by passing the starting-current through resistance.

There are naturally two distinct applications of my invention to the two types of vehicles above mentioned. The necessary differentiation of my invention to make it applicable to both types is set forth fully in the drawings and specification.

In general my invention consists in converting the series motors into separately-excited generators, the fields being excited from a regulable low-voltage source of current, which may be either a storage battery or motor-generator, and the current generated by the armature being returned to the system; and it consists, further, in relatively lowering the electromotive force opposed to the generating-armatures so as to continue the generating action of such armatures below their point of generation when opposed by their normal voltage; and it consists, further, in the commercial requirement of a provision for prevention of any reversal of current taking place between motors when acting as generators and the source of current.

Having described in general terms the objects attained by my invention, I will now describe one of its physical embodiments and the manner of application of it to each type of vehicle above mentioned, reference being had to the accompanying drawings.

Figure 1 is a perspective view of the controlling-lever of a part of my controlling mechanism for the automobile class of vehicles, designed to be steered as well as operated by the driver. Figs. 2, 3, and 4, are plan, side, and end elevations of the same and some of its connections. Fig. 5 is a wiring diagram, development of the control-switch and circuit-breaker, adapted to one motor for such vehicle. Fig. 6 is another form of circuit-breaker. Figs. 7 and 8 are various forms of cycloids, illustrative of the means which cause rotation of the control-switch. Figs. 9 and 10 illustrate two of the forms of plate which I may use to cause such rotation. Fig. 11 is a wiring diagram and development of the control-switch adapted to two motors for a vehicle of the second type, one control-switch only being shown. It will be easily understood that another control-switch could be connected after the common practice of the day if it were desirable to use two such control-switches. Figs. 12, 13, 14, 15, and 16 are the various combinations effected by the control-switch shown in Fig. 5 to propel the vehicle. Fig. 17 is the combination effected in order to charge the battery. Figs. 18, 19, 20, and 21 are the various combinations effected to brake the vehicle. Figs. 22, 23, 24, 25, 26, 27, 28, 29, 30, and 31 are the various propelling combinations effected by the control-switch shown in Fig. 11, while Figs. 32, 33, 34, and 35 are the various braking combinations of the same control-switch.

Referring again to Fig. 1, X is a lever pivoted at Y, terminating beyond in a yoke W'. Attached to the lever is the plate V, in which are grooves or slots W of a cycloidal form X, the lever terminating at its upper end in a round shaft X' to form the seat of the handle Z, so that the handle may be rotated on the lever. Y' is a casing surrounding the apparatus, pierced by the slot 2, which has an enlargement 3 at one point for the entrance of the handle Z. This handle, containing a socket at its lower end to engage the shaft X', consists of a grip, a narrow rectangular portion Z' of greater diameter in one direction than the other, and a key $Z^2$, lying in the same direction as the long diameter of the rectangular portion and below it. This key $Z^2$ is of such a shape and size that it can only be entered at the enlargement 3 of the slot 2 in a certain position, as shown in Fig. 1. When so entered and the handle is seated on the lever, the key $Z^2$ engages arms $Z^3$, which operates a reverse-switch $Z^4$. In the position shown in Fig. 1 the lever as a whole cannot be swung either forward or backward, as the long diameter of the rectangular portion of the handle Z is crosswise to the slot 2. A rotative movement of ninety degrees must be given the handle Z, so as to bring the long diameter in line with the slot before the lever can be shifted. Such movement will throw the reverse-switch either to go ahead or to go back, according to the direction in which the handle is rotated. To reverse, it is only necessary to bring the handle back to the point of enlargement of the slot, or "off" position, and give it a turn of one hundred and eighty degrees and then operate as before. It is also evident that the handle cannot be removed from the slot when in any but the off position, and when in the position shown in Fig. 1, ready to be removed, the reverse-switch is half-way between the two operative positions. In other words, the circuits through it are completely broken. Hence when the handle is removed the vehicle is practically locked, as the lever X, operating the controller, does not project beyond the casing, and even if it were moved it would not drive the vehicle, as the circuits through the reverse-switch are broken.

Referring now to Figs. 7 and 8, various forms of cycloids are illustrated. Fig. 7 is a "cycloid," properly so called. Fig. 8 is a hypocycloid. Any of these curves might be used to cause a rotary movement of the control-switch; but the hypocycloid is especially applicable, as occupying less space. As a cycloidal curve is a line traced in a plane by a point on a circle when said circle rolls on a given path in another plane at right angles, it is evident that by fixing the center of the circle containing the generating-point and causing the cycloidal curve to move in the same direction and the extent of the generating-circle the generating-point will trace out a circle around the fixed point. As, for instance, in Fig. 7, if the plane with the "cycloid," properly so called, be passed to and fro horizontally, a point bearing on the cycloid, and fixed as regards transition but movable about a center, will be forced to describe a circle about the said center; likewise also in Fig. 8 with the hypocycloid. I prefer to use, however, a combination of hypocycloids and a double crank, one hundred and eighty degrees apart, one part running in one hypocycloidal groove and the other part in the other groove. This form is shown in Fig. 1 of the drawings where the grooves are shown upon a plate attached to the lever. Figs. 9 and 10 illustrate other forms of plate which may be used to produce the same result. The plate shown in Fig. 9 is provided with cycloidal grooves and would have to be moved in a straight line, while the one shown in Fig. 10 has epicycloidal grooves and would have to be moved in the arc of a circle.

Referring to Fig. 4, U represents the control-switch cylinder, and U' U' the cranks attached and engaging the grooves W in the plate V. From what has been said above it is evident that a movement of the lever X with the plate V attached will effect the rotation of the cranks U' U' and the control-switch cylinder U. By making the radius of the generating-arc of the cycloidal curves large relative to the radius of the cranks any desired large movement of the control-switch may be caused by a comparatively small movement of the lever X. The grooves W, Figs. 1 and 3, after a certain point depart from their cycloidal shape and assume an arc shape, with the point Y as a center, and it is evident, therefore, that if the plate be pushed so far that the crank projections enter these arcs no further rotation of the control-switch will be caused by a further movement of the lever and that said control-switch will be locked in whatever position it has then assumed, while the lever is free to continue its movement. This further movement is utilized to apply a mechanical brake, Fig. 3, by the engaging of the yoke W' on the end of the lever X with a slotted brake-rod $W^2$, which in turn operates any well-known braking device, such as a band-brake $W^3$. The slot in the brake-rod $W^2$ allows the lever to make its forward movement without any corresponding movement of the brake-rod.

Referring now to the circuit-breaker shown in Fig. 5, T is a magnet wound with two coils. L is a latch for the arm J, normally held by a spring opposing the action of the magnet. The pivoted arm J carries two sets of contacts $E' E^2$ and $S' S^2$, which close, respectively, the two circuits leading to the two coils of the magnet T. This arm J is under tension of a spring tending to open it, but is normally held closed by the latch L. Pinned to the arm J and moving with it, guided by the pin $J'$ in a slot, is the slide $J^2$, which carries a roller K. A cam $K'$, carried on the control-switch shaft, is adapted when the shaft is revolved to engage roller K and when the arm J is open forces slide $J^2$ back, carrying the arm J, thereby closing the circuits at the contacts $E' E^2 S' S^2$. In the position shown in Fig. 5 the cam $K'$ is in its extreme position and the arm is closed and latched. A predetermined amount of current in the magnet T will lift the latch and allow the arm to open, thereby opening both circuits. The cam $K'$ is placed in such a position on the shaft that it occupies the position shown in the drawings only when the control-switch is at its off position. Hence in all operative positions the circuit-breaker is free to open and may be closed by turning the control mechanism to its off position.

By making the current in one coil of the magnet T circulate in a different sense from that in the other, the magnet can be made to have no effect, practically, on the latch L until one current far exceeds the other; but, on the other hand, if one current reverses, a very slight amount of it adding its effect to the other will quickly trip the latch. Also one current acting alone in the magnet-coils may serve to trip the latch. Thus the breaker will act either as a reverse-current breaker or as an overload-breaker.

A different form of reverse-current breaker is illustrated in Fig. 6. T T are electromagnets, as before, in whose coils only one current (whose reversal is to be prevented) circulates. $T'$ is a permanent magnet having one bifurcated pole on which the two magnets are mounted, and the other curving around and terminating in the latch L, which is hinged and lies between the poles formed by the two magnets. The current circulates in the two coils in a different sense. Hence a current flowing in one direction will weaken one bifurcation and strengthen the other, thereby attracting the latch toward the stronger bifurcation. Should the current reverse, the effects of the two magnets will be reversed and the latch will move in the other direction. Hence with the circuit-breaker designed to remain closed with the current in one direction a reversal of said current will at once lift the latch, allowing the spring to open the arm J, thereby opening all circuits. The cam $K'$ on shaft $K^2$ serves the same purpose as before—namely, closing the breaker after it has opened by returning the control-switch to its off position.

The difference in the shape of the cams in Figs. 5 and 6 is due to the fact that the breaker shown in Fig. 5 is adapted to operate either as a reverse-current or as an overload-circuit breaker and to be closed by returning the control-switch to its off position from either direction, whereas that shown in Fig. 6 is adapted to operate only as a reverse-current circuit-breaker and to be closed by returning the control-switch to its off position from only one direction and to be held closed by said cam in all positions on the power side of the off position. The application of these circuit-breaking devices will appear in the description of the control-switches.

Referring to Fig. 5, A B C D are four groups of storage-cells of a convenient number permanently connected within each group. The poles of these groups terminate, respectively, in the fingers $a$ $a'$ $b$ $b'$ $c$ $c'$ $d$ $d'$ of the control-switch, which is preferably of the usual form and construction now in use. A resistance R S is connected between fingers $f'$ and $f^2$, and resistance R $S'$ between fingers $m'$ and $m^2$. These are preventive resistances and are used after the well-known practice when inserting or withdrawing one group of cells in series relations to another group in order to prevent short-circuiting of the group withdrawn or inserted and at the same time to maintain the circuit unbroken. They serve no purpose of regulation in driving, for though in circuit and in series momentarily they have no appreciable effect on the current strength, as they are designed to absorb the normal output of the group they protect. Resistance R S is used, however, for regulation in braking, as will appear below. Resistance R, from which three connections are made to fingers $r'$ $r^2$ $r^3$, is used as a shunt to the field of the motor to increase the speed when driving and as a regulating resistance, together with the resistance R S, above mentioned, when braking. F is the field of the motor, and Q its armature. S is a reversing-switch of common construction. M is an ammeter. E is an independent storage cell or cells, according to requirements, and is connected from its negative pole to finger $e$ and from its positive pole through contacts $E' E^2$ on the circuit-breaker and one winding of the magnet T to the finger $e'$. A branch connection from the positive terminal of the battery E extends to the positive charging-terminal H. Similarly a branch connection from the negative side of the reverse-switch extends to the negative charging-terminal $H'$.

When the line of fingers fall under the lines 1 2 3 4 5 on the power side, the following combinations are formed, respectively: First, the four groups of cells A B C D are in multiple, respectively, by the fact that the positive fingers $a\ b$ of groups A and B engage with contact-piece $G'$, to which is connected $G^4$, which likewise engages positive fingers $c\ d$ of the groups C and D, and the battery so grouped is connected to the motor through finger $f'$, which engages contact-piece $G'$, thence through the contacts $S'\ S^2$ on the circuit-breaker and one winding of the magnet T, through the ammeter M to finger $M'$, which engages contact-piece $G^5$, to which is likewise connected $G^2$. These two contact-pieces engage the negative fingers $a'\ b'\ c'\ d'$ of the groups A B C D, thus completing the circuit. This combination is shown diagramatically in Fig. 12. When the fingers are moved under line 2, Fig. 5, the above connections remain the same, with the addition that the resistance R is placed as a shunt around the field F by the engagement of the finger $r'$ with the contact-piece $G'$. This combination is shown in Fig. 13. When the fingers are moved under line 3, the battery is arranged in series multiple, the resistance R S' being first thrown in by contact with finger $m^2$ and thrown out again by contact with finger $m'$ and connected with the motor without the field-shunt, as illustrated in Fig. 14. Under position line 4 the connections are the same as under line 3, except that the resistance R is again connected as a shunt to the field. (Illustrated in Fig. 15.) Under position line 5 the battery is arranged in series and connected to the motor without the field-shunt, as shown in Fig. 16. Under position line O the fingers do not engage any contacts, and this is the off position of the control-switch. Just back of this position is a line of contacts $Q'\ Q^2$, &c. These serve, as is clearly shown, to put the groups A B C D in series with each other and in series with the independent cell or cells E in order to charge. The circuit in this case is from the positive charging-terminal through battery E to finger $e'$, thence by contact $Q'$ to finger $a$, and so through the groups A B C D in series by means of fingers $a'\ b$, connected by $Q^2$, fingers $b'\ c$, connected by $Q^3$, fingers $c'\ d$, connected by $Q^4$, thence from $d'$ to $m'$ through $Q^5$, through the meter M, one coil of magnet T, contacts $s'\ s^2$ of circuit-breaker to the negative charging-terminal $H'$. This combination is illustrated in Fig. 17. Under position line 2 on the brake side of the off position the battery is grouped into multiple and connected (the positive of battery to the positive brush) directly to the armature through the medium of the fingers $o'$ and the wire $R^4$, while the field is connected through the resistances R S and R and to the battery E by means of the fingers $r',\ e, e',$ and $f^2$. Both field and armature circuits are carried through the coils on the magnet T and separable contact parts of the circuit-breaker. If the motor should be running at such a speed as to generate more voltage than that of the battery as then grouped, current will flow to the battery to charge it and in so doing will circulate around the windings of the magnet T in an opposite sense to that flowing from the battery E to the field, thus exciting little tendency to trip the latch as long as the two currents are in any predetermined ratio; but if the speed of the motor (now a generator) should fall so low that the voltage of the battery exceeds it current would flow the reverse way in its coil of the magnet T, adding its own to the magnetic effect of the current in the field-circuit, thereby quickly tripping the latch and opening both circuits, so that there will be no further drain on the batteries even in the field-circuits. The combination effected is shown diagrammatically in Fig. 18. Under position lines 3 4 5 the general connections remain the same, with the exception that under position 3 the resistance R S is cut out of the field-circuit, and under position 4 part of the resistance R, and under position 5 all resistance. It is evident that the circuit-breaker is able to open under any one of the positions and, indeed, would open more quickly under the last position than under the first in case of reversal. The change of curvature in the slots of the operating mechanism on the lever shown in Figs. 1 and 3 and already described is for the purpose of leaving the control-switch at its point of greatest electrical braking effect while the mechanical brake is being applied. Under such circumstances it also becomes evident that a circuit-opening device such as I have described is an essential part of my invention, for otherwise should the mechanical brake be applied with sufficient force to stop the vehicle the motor would be left connected to the battery. By my invention I secure a great improvement over the device of opening the circuit by the act of applying a mechanical brake—namely, that the electric brake can still continue to act even though the mechanical brake is being used as long as the conditions for its use are favorable and then the circuits are opened automatically. The same circuit-opening device also acts as an overload-circuit breaker and having operated is reset by the mere movement of the control-lever to its off position—the proper point of starting after an interruption of any sort. It is also evident that the brake cannot be applied while current is being used, or vice versa, nor can the vehicle be reversed either when the brake is applied or when the current is on.

In the type of vehicles obtaining their power from an external source I use the same general method of control, a control-switch and the necessary wiring being shown in Fig. 11. In braking, the power in this case may be either delivered to the main source or to the auxiliary source, either of which plans has its own advantages. As of wider applications—namely, for vehicles making frequent stops, with short grades, in contradistinction to those making few stops, with long grades—

I will illustrate a control-switch adapted to return power to the auxiliary source; but it is evident that the few changes necessary to deliver the recovered power to the main source could be made by any one skilled in the art without departing from the spirit of my invention.

In case of vehicles obtaining their power from an extraneous source I also introduce the auxiliary source—a storage battery or motor-generator—as a regulating device to take the place of resistances, thereby saving what in all systems now is an unregainable loss. I provide, as before, several groups of storage batteries A B C D E, preferably and as illustrated each of the same number of cells, permanently connected within themselves. Four resistances are provided, $R'$ $R^2$ $R^3$ $R^4$, all of them preventing resistances, used in the common manner to prevent short-circuiting a group of cells when inserting it or withdrawing it in series relation to another group. I illustrate two motors, although the system is applicable to any number of motors. 16 is a reversing-switch of common construction and need not be further described. It reverses the fields. T is the magnet of the circuit-breaker, the magnet only being shown, as the circuit-breaker may be of the form shown in Fig. 5 or 6 and of course carries contacts to break each of the circuits passing around the magnet, although such breaks are not shown. $F'$ and $F^2$ are the fields of the motors, and $O'$ and $O^2$ the armatures. The first three power positions are illustrated in Figs. 22, 23, and 24, respectively, and consist, first, in connecting the two motors in series supplied by the four groups of battery A B C D in multiple; second, as before supplied by four groups of battery in series multiple; third, as before supplied by the four groups in series. The fourth position is illustrated in Fig. 25 and connects all five groups in series and in circuit with but in opposition to the impressed current from the trolley or other main source to the motors still grouped in series. The fifth position (illustrated in Fig. 26) changes only the grouping of the battery, the group E being cut out and the other four being arranged in series multiple, the connections to trolley and motors remaining the same as in the last position. The sixth position (illustrated in Fig. 27) also changes only the battery, all five groups being arranged in multiple. The seventh position (see Fig. 28) cuts out the battery entirely, leaving the external source of supply connected direct to the motors in series. Between the lines 7 and 8 the familiar series-multiple change of motors is made and need not be further described. The battery is again inserted in circuit with but opposing the impressed current, and in order to accommodate the greatly-increased volume demanded by the motors in multiple is grouped in position 8 in its series-multiple relation, and hence consists of two groups. This is illustrated in Fig. 29. Position 9 contains no changes except that the battery is arranged all five groups in multiple, as illustrated in Fig. 30. Position 10 cuts out the battery and connects the external source of current directly to the motors in multiple. (See Fig. 31.) I use no regulating resistance in any of these combinations, and the power needed to start the vehicle is supplied by the batteries, thereby relieving the feeding system of its heaviest load, the batteries being partially recharged in regulating the admission of power from the line in the later positions. The braking is accomplished, as in the former case, by converting the series motors into separately-excited generators. In the first position one group E is used to excite the fields connected in series through a resistance $R^3$, while the armatures grouped in series are connected to the four cells of battery A B C D, grouped in series, as illustrated in Fig. 32. In the second position the resistance in the field is cut out. (See Fig. 33.) In the third position the fields are again supplied through resistance, while the armatures still grouped in series are connected to the battery grouped in series multiple, as illustrated in Fig. 34. In the fourth position the resistance in the field-circuit is again cut out. It is evident that the braking could be carried still farther by further grouping the battery in combination of lower electromotive force and that more resistance steps could be added in the field-circuit. I have illustrated the latter method in Fig. 5 and the former in Fig. 11.

Having thus described my invention, what I desire to secure by Letters Patent is—

1. In an electrically-propelled vehicle, the combination of one or more series motors, groups of battery-cells with a controlling mechanism by means of which the cells may be grouped successively in various internal relations and connected to the motor or motors, first as the sole source of supply then in series with the motor or motors and the main source of supply, to effect a regulation of such main current and to become themselves charged, and means whereby the same series motor or motors may be converted to separately-excited generators the field or fields being excited by a low-voltage current regulable by resistance, and the armature or armatures so connected to the system as to return power thereto, substantially as described.

2. In an electrically-propelled vehicle, the combination of one or more series motors, a battery of storage-cells, an extraneous source of current-supply with a controlling-switch adapted to start the motors in series by connecting thereto the storage battery grouped in its order of lowest electromotive force and to gradually increase such electromotive force by various internal combinations of the storage battery at the same time preserving the quantity of current through each cell in circuit substantially the same; to disconnect such battery from the motors when its order of highest electromotive force has been reached and to reconnect said battery in its highest order of electromotive force to the motors still in series in circuit with but opposing the impressed current from the main supply, and to gradually decrease the electromotive force of the battery by various internal combinations at the same time preserving the quantity of current through each cell in circuit substantially the same, and to place such battery out of circuit after its lowest order of electromotive force has been reached, leaving only the motors in series connected to the source of supply; and then to reconnect the battery in a high order of electromotive force in circuit with, but opposing the impressed current, and at about the same time to regroup the motors in a multiple relation, and to gradually decrease the electromotive force of the battery at its terminals by various internal combinations at the same time maintaining the quantity of current through each cell in circuit substantially the same, and to finally cut each battery out of circuit, leaving only the motors in multiple relation connected to the source of supply, substantially as described.

3. In an electrically-propelled vehicle, the combination of one or more series motors, an auxiliary source of current-supply, a main source of current-supply and a controlling switch or mechanism adapted to be turned either side of an "off" or non-operative position and adapted on the one side to connect the main source of current-supply to the motor or motors so that its effective electromotive force at the terminals of the motor or motors will be small and to gradually increase such electromotive force until the electromotive force of the source of supply is reached, without the use of resistances and adapted on the other side of the "off" position to connect the field or fields so as to separately excite them with a low-voltage current from the auxiliary source of supply, through resistance regulable by the progressive movement of the control-switch, and to connect the armature or armatures to the source of supply in such a manner that a current will be generated of sufficient electromotive force to be returned to the source of supply.

4. In an electrically-propelled vehicle, the combination of a series motor, and a controlling-switch adapted to effect control of such series motor with means for braking such vehicle by exciting the field with a low-voltage current and for connecting the armature independently to the battery grouped successively in combinations of lower and lower electromotive force, substantially as described.

5. In an electric-motor circuit, the combination of one or more motors, a source of current-supply and a controlling mechanism adapted to operate the motors as motors to drive, or as generators to brake, and to return such generated energy to the system, with a circuit-opening device in such electric circuit, adapted to open automatically under certain predetermined abnormal conditions, and means operated by said controlling mechanism adapted to close such circuit-opening device at predetermined points of its operation, substantially as described.

6. In an electric-motor circuit the combination of one or more motors, a source of current-supply and a controlling mechanism adapted to operate the motors as motors to drive, or as generators to brake, and to return such generated energy to the system, with a circuit-opening device in such electric circuit, adapted to open automatically upon reversal of the current in the generator-circuit, and means operated by said controlling mechanism adapted to close such circuit-opening device, at or near its "off" position.

7. In an electric-motor circuit the combination of one or more motors, a source of current-supply and a controlling mechanism adapted to operate the motors as motors to drive, or as generators to brake, and to return such generated energy to the system, with a circuit-opening device in such electric circuit, adapted to open automatically upon an excessive current in the motor-circuit, or a reversal of current in the generator-circuit, and means operated by said controlling mechanism adapted to close such circuit-opening device at or near its "off" position.

8. In an electrically-propelled vehicle, the combination of a series motor and a controlling-switch adapted to effect control of such motor, with means for braking such vehicle by exciting the field with a low-voltage current and for connecting the armature independently to the battery grouped successively in combinations of lower and lower electromotive force at the same time maintaining the current through each cell in circuit substantially the same.

9. In an electrically-propelled vehicle the combination of one or more series motors, an auxiliary source of current-supply, a main source of current-supply and a controlling mechanism adapted to operate and accelerate the motors as series motors, with no regulating resistance in the main circuit, and to convert them into separately-excited generators returning power to the system, and to continue this action as the vehicle slows down, by increasing the field strength of the generators, and by decreasing the voltage opposed in successively grouping the receiving system in combinations of lower electromotive force, or by increasing the total voltage generated by connecting the armatures in series, substantially as described.

10. In an electrically-propelled vehicle the main current-supply, the auxiliary current-supply, a motor, a switch, a mechanical brake, a switch and mechanical-brake controlling lever whereby the operation of said lever admits current from the main source of supply to the motor to propel the vehicle, and admits current from the auxiliary source of supply to excite the field of the motor when it acts as a dynamo, and at the same time applies the mechanical brake.

11. In an electric-motor circuit, the combination of one or more motors a source of current-supply and a controlling mechanism adapted to operate such motors, as series motors to drive, and as separately-excited generators to brake, and to return such generated energy to the system, with an automatic circuit-opening device in the circuit between said source of energy and motor or motors, adapted to be opened on a reversal of current in the generator or an abnormal current in the motor-circuits or both, and means operated by said controlling mechanism adapted to automatically close said circuit-opening device, when said controlling mechanism is brought to or near its "off" or non-operative position.

12. In an electrically-propelled vehicle the combination of a storage battery, motors, and a controlling mechanism adapted to effect control of the motors, with means of converting such motors into generators, to brake the vehicle and return energy to the system and means for compelling the motors to generate by properly exciting them and increasing the field strength, by arranging the opposing terminal voltage in combinations of lower and lower electromotive force and by arranging the terminal voltage of the generators in combinations of higher and higher electromotive force.

13. In an electrically-propelled vehicle, the combination of a storage battery, a motor and a controlling mechanism adapted to convert such motor into a generator by properly exciting its field and increasing its field strength, and by arranging the opposing terminal voltage in combinations of lower and lower electromotive force, substantially as described.

14. In a self-propelled vehicle the combination of a pivoted lever, a controlling mechanism adapted to be rotated to effect control and a plate carried by said lever, having a slot of such form engaging with a crank adapted to operate such controlling mechanism, that a movement of the pivoted lever effects a rotation of such crank, and brake mechanism adapted to check or stop the vehicle by friction so connected to said lever as to be operative only in certain positions of such lever substantially as described.

15. In a self-propelled motive apparatus the combination of a pivoted lever, a controlling mechanism adapted to check or stop said motive apparatus, when engaged by said pivoted lever, said lever being adapted to effect rotation of the control mechanism, and of a slot or slots carried by said lever, having preferably a cycloidal form in the operative parts and engaging said crank, so as to rotate it through a certain range of movement, and in its further movement to engage said brake mechanism and at the same time to cease to rotate said crank by passing the operating part of the slot or slots out of engagement with the free end of the crank.

16. In a self-actuated apparatus, the combination of a controlling mechanism adapted to check or stop the apparatus by friction and a pivot-lever adapted to effect rotation of the controlling mechanism in a certain portion of its movement through the medium of a crank operating the controlling mechanism, and a slot or slots carried by said lever, and engaging the free end or ends of such crank, and in certain other positions of its movement to lock the control mechanism against any further movement by means of a change in a form of the slot or slots and then to operate the braking mechanism.

17. In a controlling mechanism for electrically-driven apparatus the combination of a pivoted master-lever adapted to move either side of an "off" or neutral position, connected to said lever through the medium of a crank on the control-switch, the free end of which is adapted to engage a slot, preferably of the cycloidal form, carried by the said lever in such a manner that a movement of said slot will effect a rotation of the said crank, on the one side to so connect the motor as to drive and on the other to so connect as to brake, by converting the motor into a generator driven by momentum and absorbing the power thus produced, and a further movement of said lever being adapted to lock the control-switch in its last position of greatest braking effectiveness, and to engage a mechanical brake to further continue the braking action.

18. In a controlling mechanism for electric vehicles the combination of a reverse-switch, a lever adapted to operate the control-switch, moving in an inclosing casing, a slot in said casing having an enlargement at one point, and a handle for said lever so mounted that it is rotatable on said lever and removable therefrom, and having a projection near its socket at right angles to its length, such that it can be entered in, or removed from, the slot at only one position, such projection being adapted to engage with and operate the reverse-switch, when the handle is turned on the axis of the lever.

19. In a controlling mechanism for electrically-driven apparatus the combination of a reverse-switch, a controlling-switch, the pivoted lever adapted to operate the control-switch, a guiding-slot having an enlargement at one point, and a handle for said lever removable from and rotatable about the longitudinal axis of said lever but integral with it in the movement of the lever as a whole, said handle having a key at right angles to its length and a narrow portion above and parallel to said key, adapted to run in said slot, when said handle is turned at right angles to its inserting position, said handle being adapted to be entered or withdrawn from the slot only at point of enlargement of slot on account of said key, and further adapted to complete the circuit from the control-switch to the motive apparatus through said reverse-switch in such turning, by the engagement of said projection, with lugs on the reverse-switch, and to determine the direction of rotation of the motive apparatus by the direction of such turning after insertion.

20. In an electric-motor circuit the combination of one or more series motors, a storage battery and a controlling mechanism adapted to change the motor or motors to generators, and to compel them to generate, and to continue generating by a progressive grouping of the opposing voltage, in progressively lower combinations of electromotive force.

21. In the combination of one or more series motors, a controlling mechanism adapted to change the motor or motors into generators and to compel generation and a continuation of it by a progressive decrease of the opposing voltage and thereby act as a braking mechanism, and a mechanical friction-brake adapted to be operated by said control mechanism to reinforce and continue such braking substantially as described.

22. In an electric-motor circuit the combination of series electric motive apparatus, a storage battery, a controlling mechanism adapted to change the electric motive apparatus into electric generative apparatus and to compel generation and a continuance of it by a progressive decrease of the opposing voltage into continuous lower combinations of electromotive force, by series connections of the generators, and a mechanical friction-brake adapted to be operated by said control mechanism when the combination of greatest electric braking has been reached, to reinforce and continue such braking.

23. In an electric-motor circuit the combination of one or more series motors, a storage battery and a controlling mechanism adapted to change the motor or motors into generator or generators and to compel generation, and a continuance of it by a progressive decrease of the opposing terminal voltage of the battery, and means for preserving the quantity of current through each cell in circuit substantially the same.

24. In an electrically-propelled vehicle, a controlling, braking and reversing lever consisting of a simple lever extending below its pivot-point, a plate secured above the pivot-point, and provided with grooves adapted to engage arms upon the controlling device, and a rotatable and removable handle upon the upper end of the lever having a projection to engage the reverse-switch.

Signed by me at Wilkinsburg, Pennsylvania, this 4th day of June, 1900.

BENNET CARROLL SHIPMAN.

Witnesses:
CLARA WOOD SHIPMAN,
W. F. SHROYER.